May 30, 1961 W. F. FUCHS ET AL 2,986,114
APPARATUS FOR TINNING TERMINALS OF
ELECTRICAL COMPONENTS
Filed April 1, 1957 10 Sheets-Sheet 1
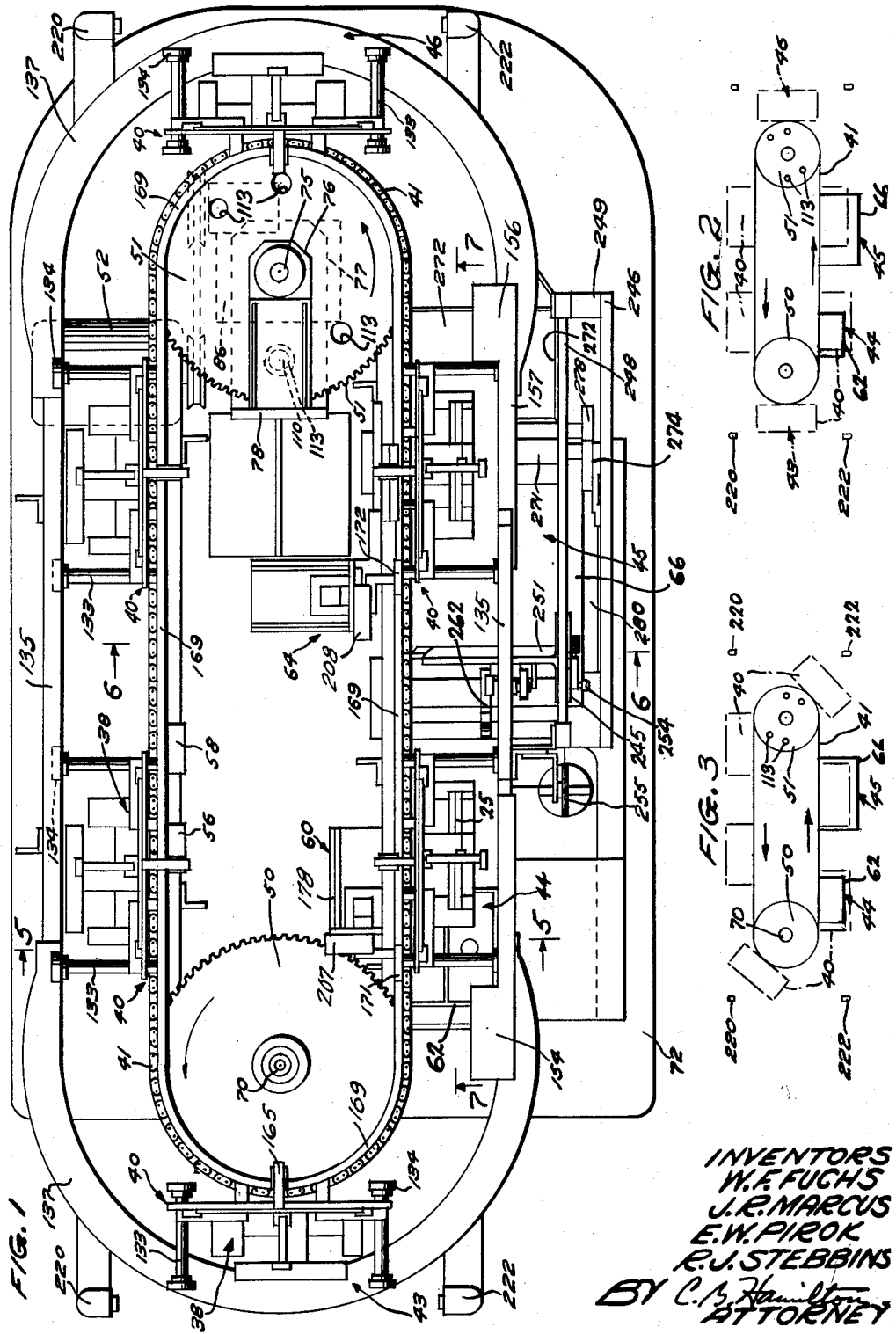
INVENTORS
W. F. FUCHS
J. R. MARCUS
E. W. PIROK
R. J. STEBBINS
BY C. B. Hamilton
ATTORNEY

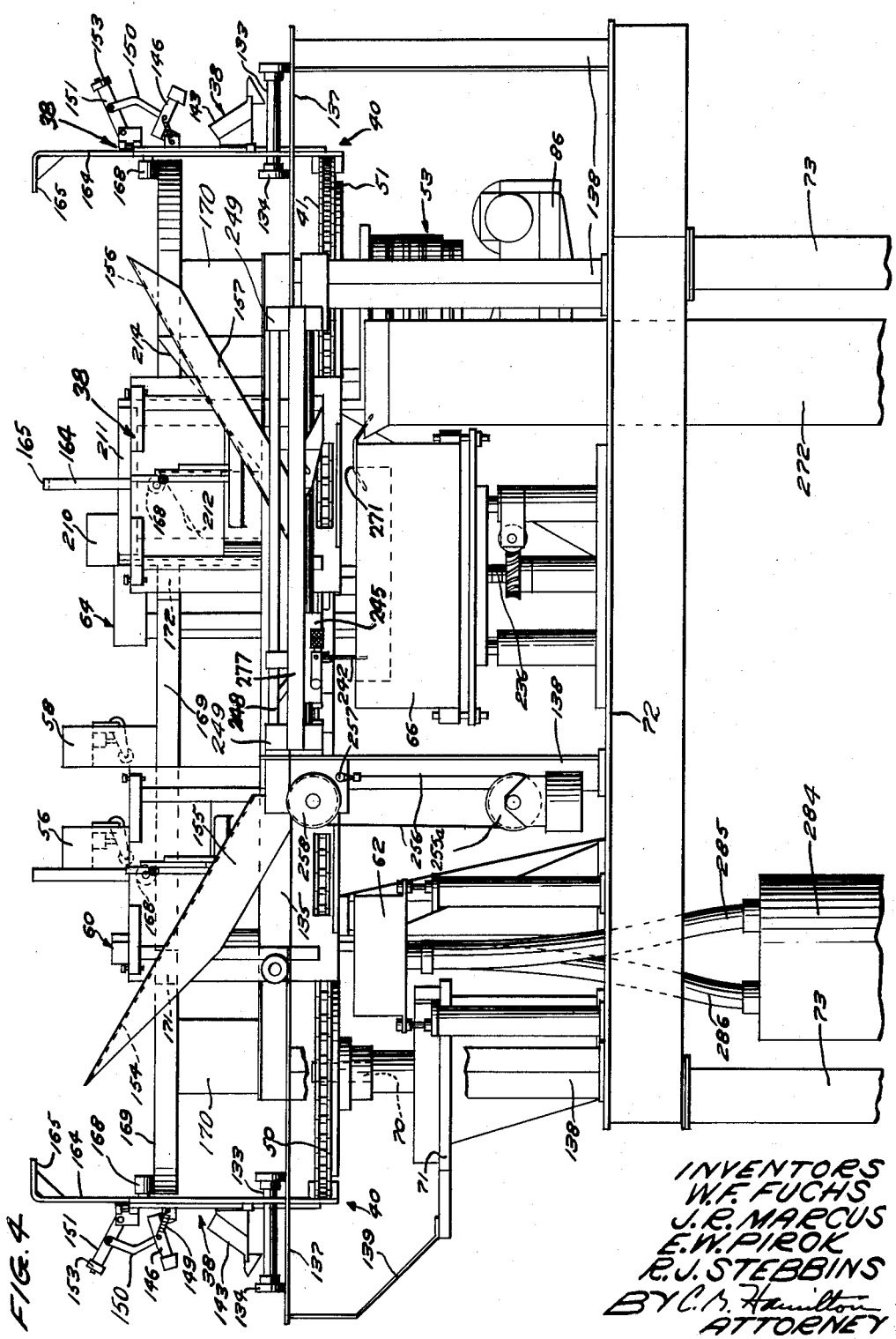

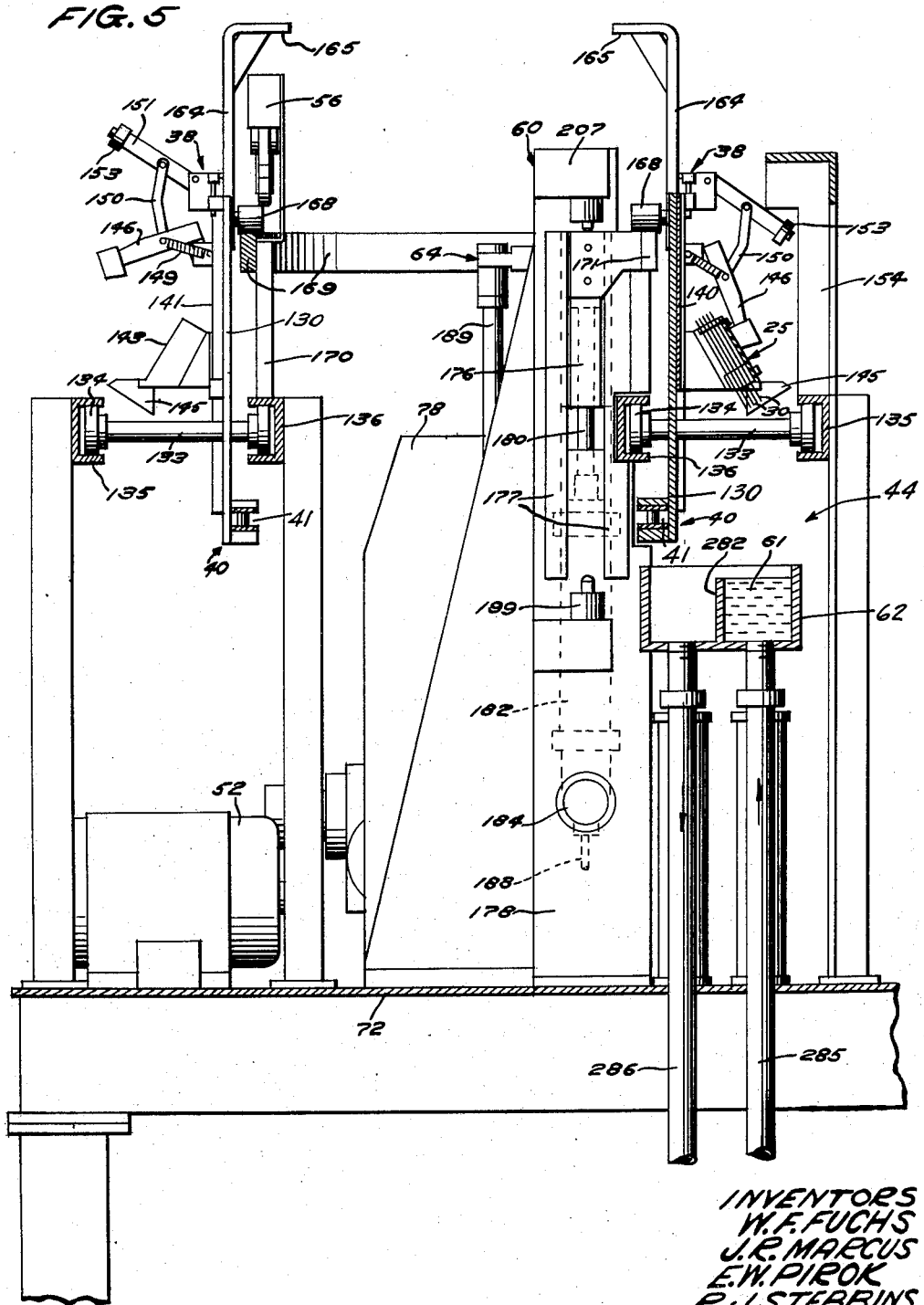

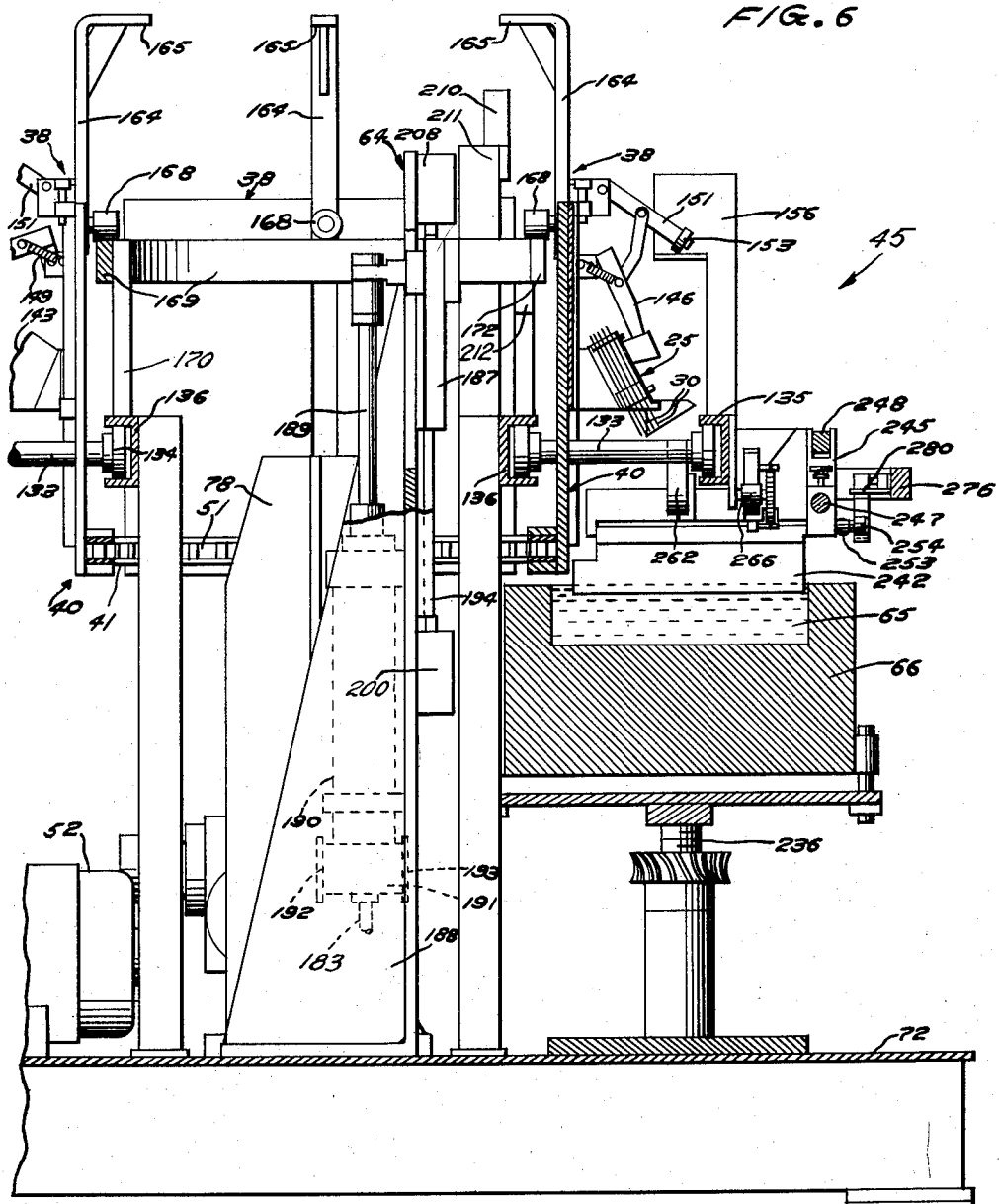

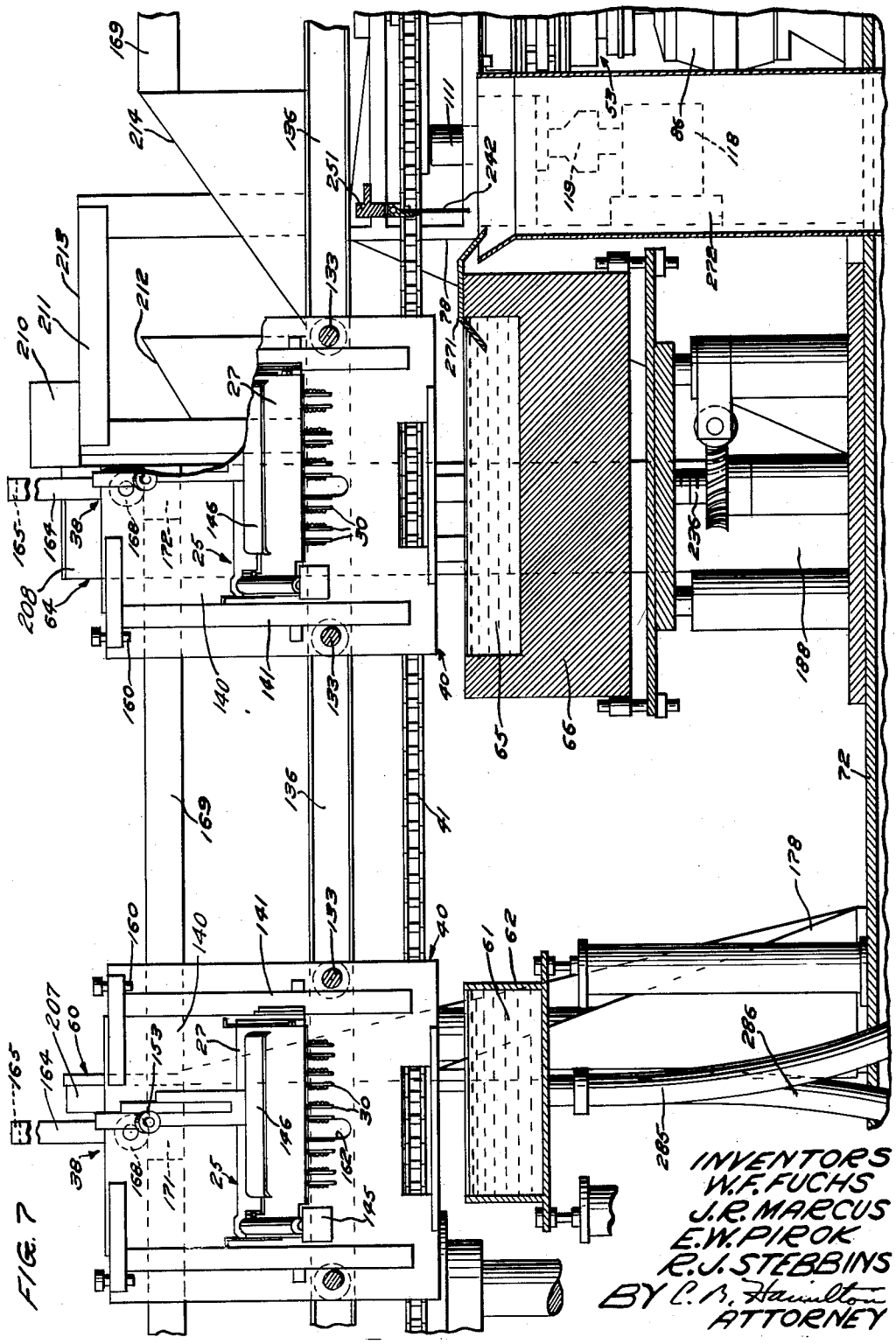

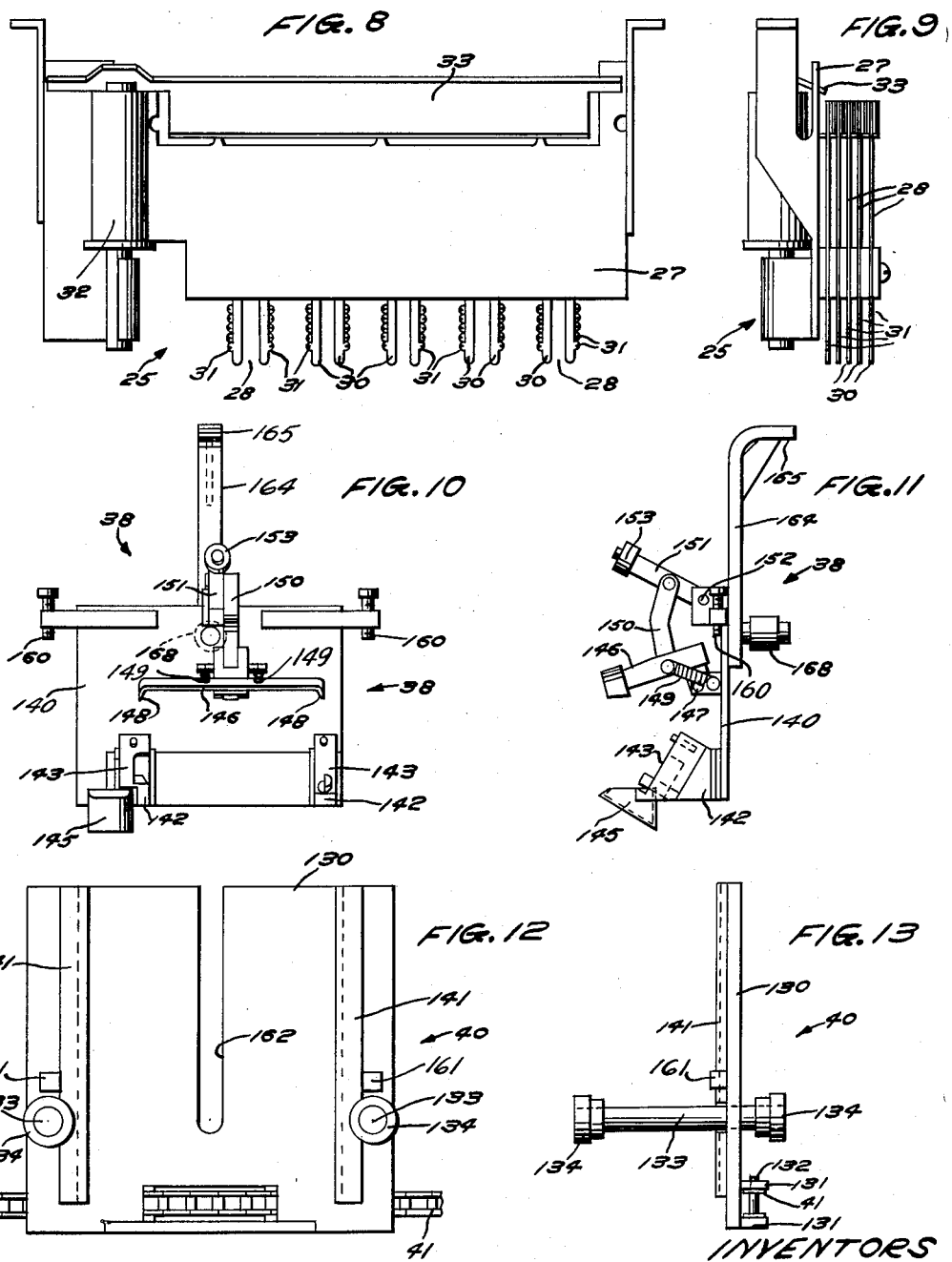

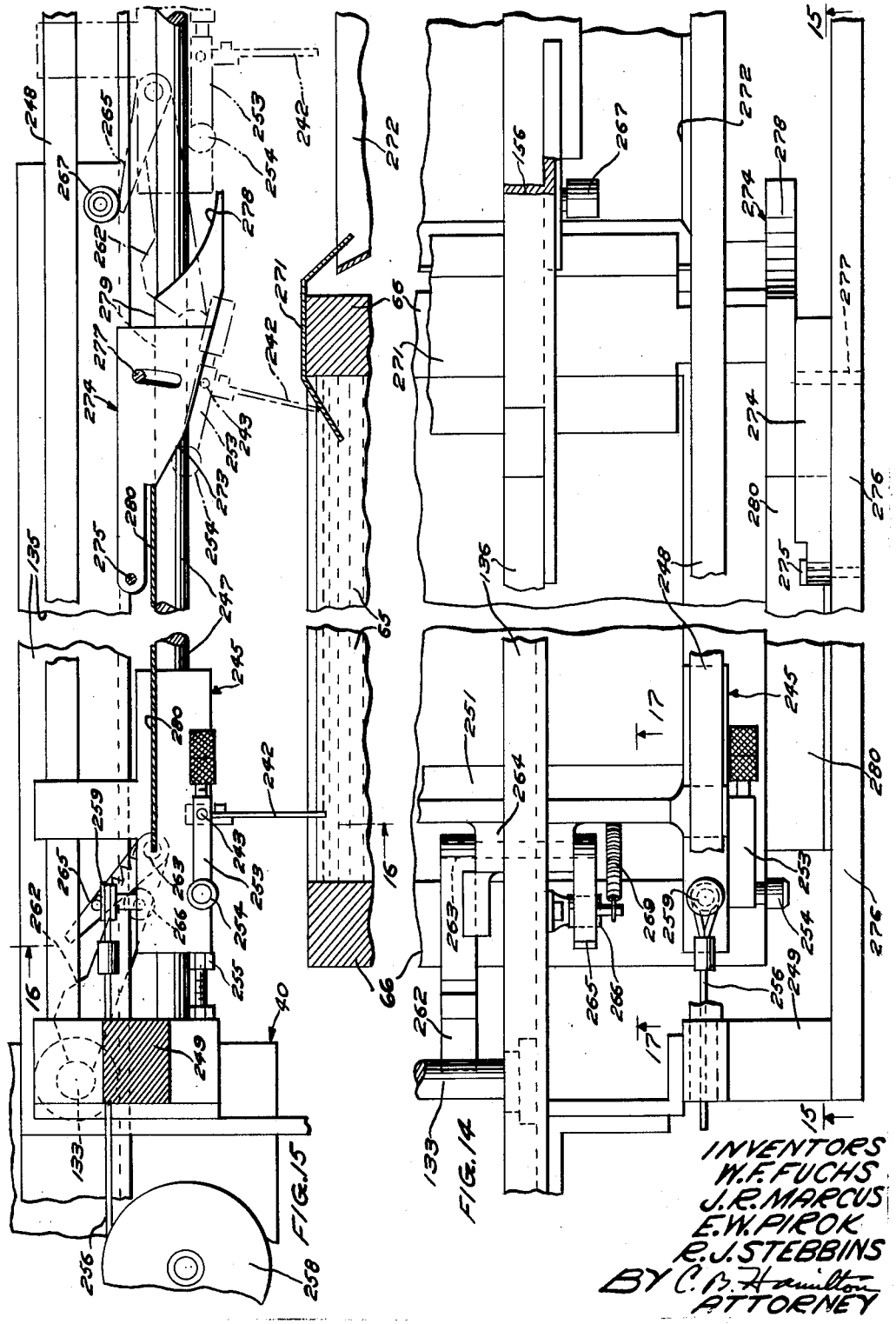

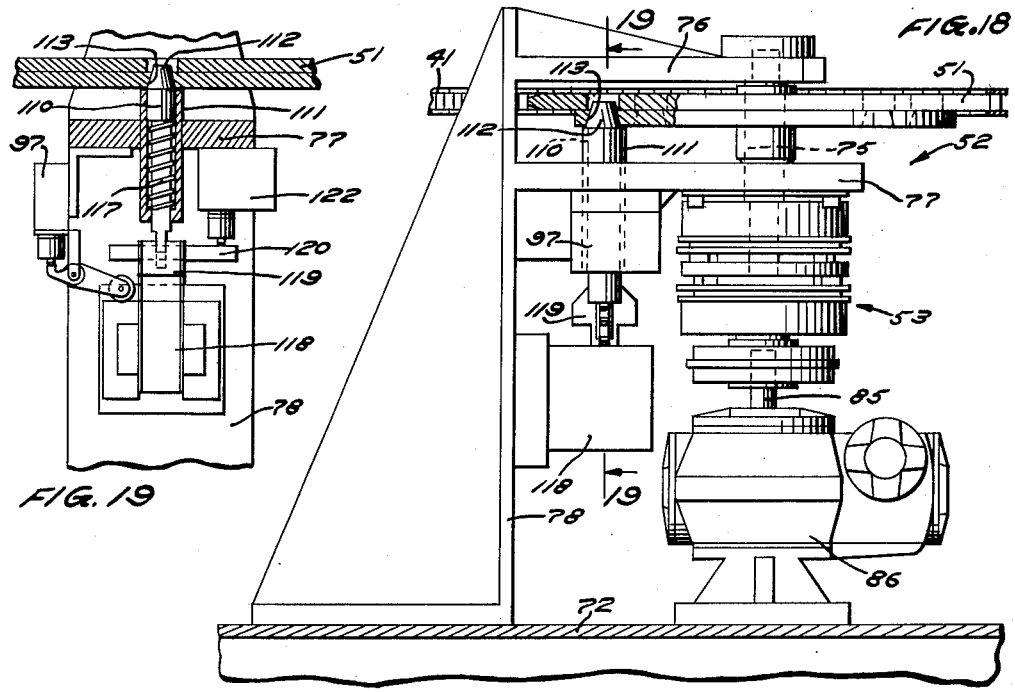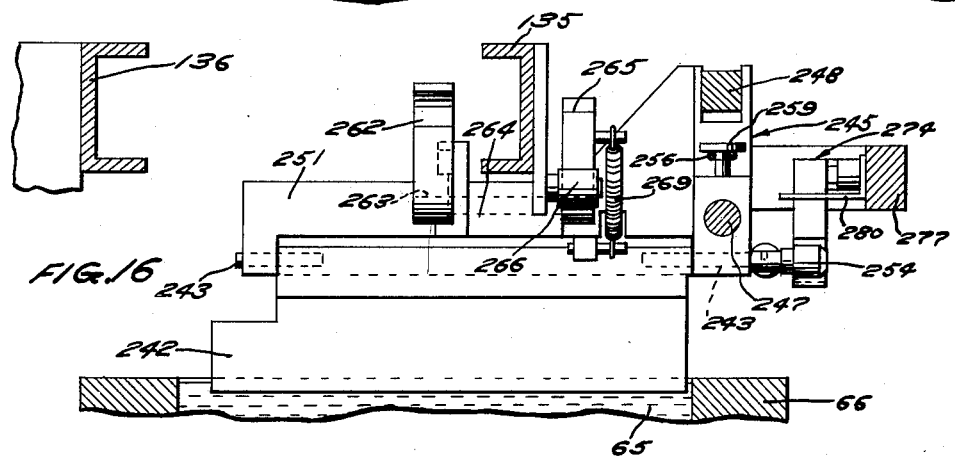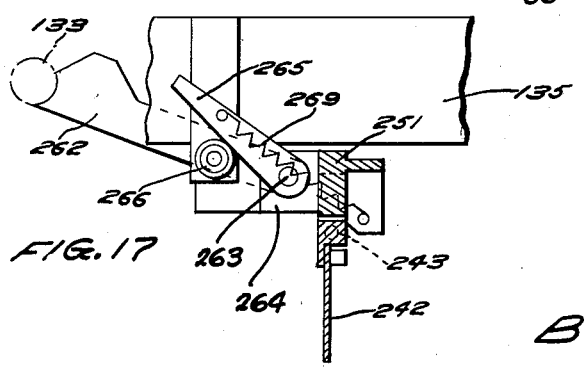

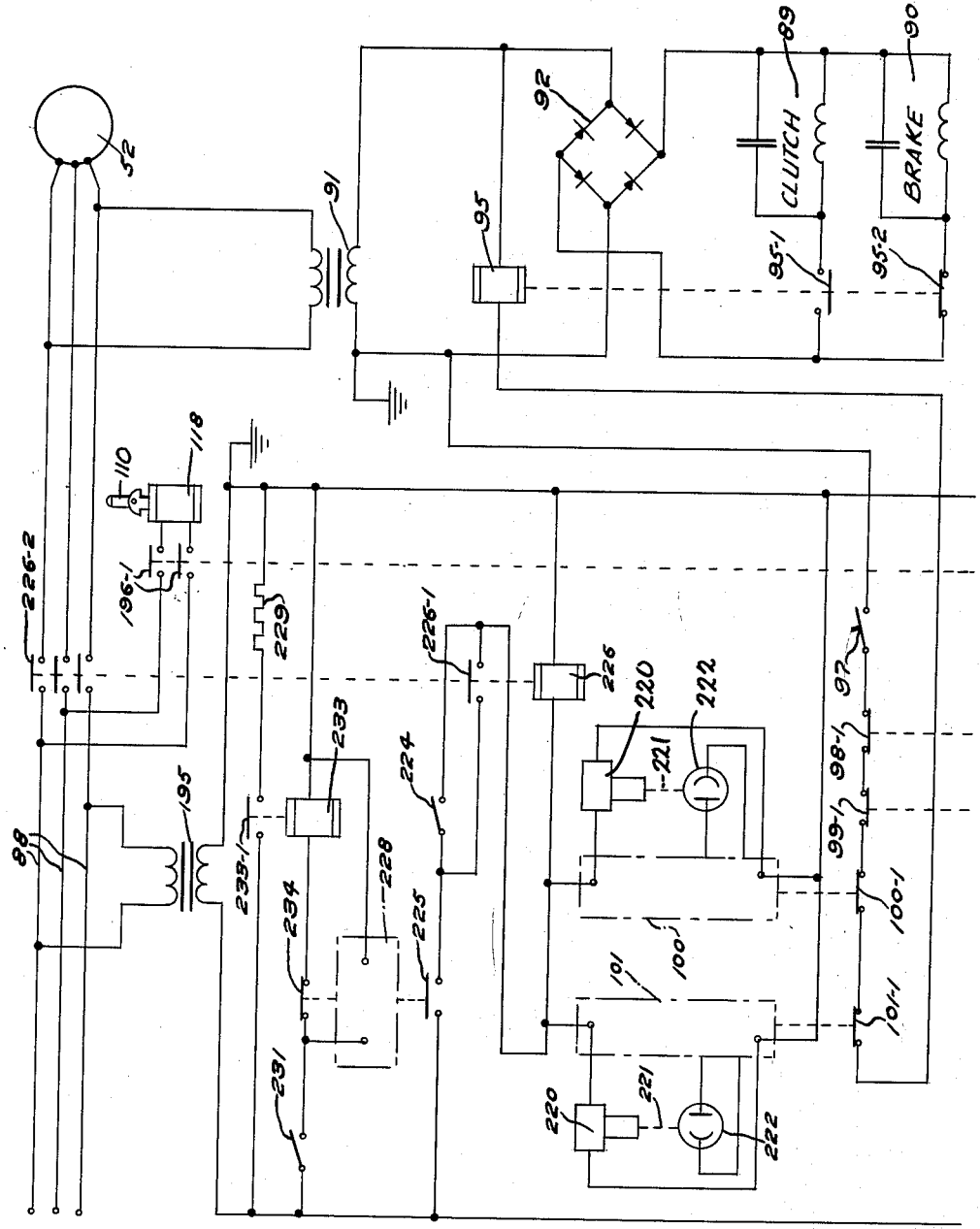

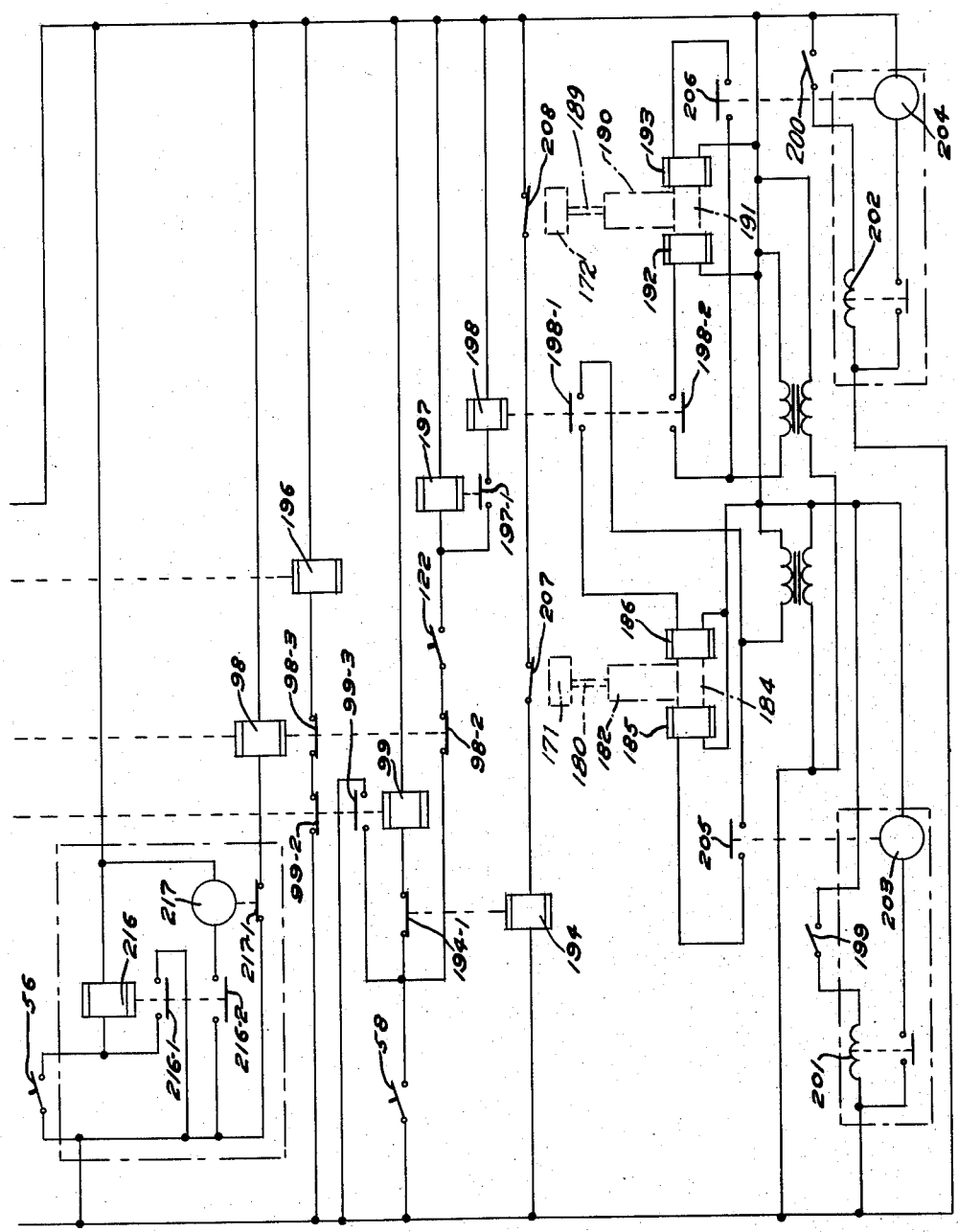

United States Patent Office 2,986,114
Patented May 30, 1961

2,986,114
APPARATUS FOR TINNING TERMINALS OF ELECTRICAL COMPONENTS

William F. Fuchs, Lancaster, Ohio, and Jerome R. Marcus, Chicago, Edward W. Pirok, Westchester, and Reginald J. Stebbins, Chicago, Ill., assignors to Western Electric Company, Incorporated, New York, N.Y., a corporation of New York Filed Apr. 1, 1957, Ser. No. 650,018

9 Claims. (Cl. 118—11)

This invention relates to article dipping apparatus and more particularly to apparatus for fluxing and tinning terminals of electrical components.

An object of the present invention is to provide an improved machine for dipping articles.

Another object of the invention is to provide an article dipping apparatus having article holders and conveyor means for moving them in one direction alternately into a loading station and a dipping station and for stopping them at the loading station for predetermined loading time periods for loading articles into the holders and for stopping them at the dipping station for predetermined dipping time periods, and to provide for dipping the articles at the dipping station into molten metal and then shaking the excess metal therefrom during the intervals between the loading time periods.

Another object of the invention is to provide an apparatus having a conveyor with a plurality of article holders for supporting a plurality of articles and moving them successively through loading, flux dipping, tin dipping, and unloading stations and with the article holders and the stations arranged relative to each other so that when the article holders are moved into the loading and unloading stations, no articles are in the dipping stations, and vice versa.

Another object of the present invention is to provide an apparatus having a conveyor for supporting a plurality of article holders thereon and having drive means for moving the conveyor to advance the article holders through loading, flux dipping, tin dipping, and unloading stations, and for stopping the conveyor with the article holders in the dipping stations at one time and in the loading and unloading stations at another time for predetermined individually adjustable periods of time.

A further object of the invention is to provide elevator means at the flux dipping and at the tin dipping stations for moving the article holders individually relative to the conveyor to dip the articles into a flux bath and a molten solder bath, respectively, and for controlling the length of time the articles individually are in the baths.

A further object of the invention is to provide means for shaking the excess molten solder off of the articles before the solder solidifies thereon.

A further object of the invention is to provide photo-electric control means at the loading and unloading stations operable to stop the conveyor for a period longer than the normal predetermined loading time period in the event that an operator has not completed the loading or the unloading operation and withdrawn his hands to safety within the predetermined loading period, and to stop the conveyor at any time while the conveyor is in motion, in the event that an operator places his hands in the loading or unloading areas.

An apparatus illustrating certain features of the invention may include a conveyor having a plurality of article holders mounted thereon for vertical movement relative thereto and for step-by-step movement therewith into a loading station, a flux dipping station, a tin dipping station, and an unloading station, the arrangement of the holders and the stations being such that a pair of article holders are moved into the loading and unloading stations on one step of the conveyor and a pair of holders are moved into the dipping station on the next step, and when the holders are in the latter stations, no holders are in the former stations, and vice versa. The conveyor, actuated by a motor drive through an electro-magnetic clutch and brake, advances a pair of holders into the loading station and the unloading station and is stopped for a predetermined loading time period to permit an article to be loaded into the holder at the loading station and a tinned article to be removed from the holder at the unloading station, after which the conveyor is actuated to move the holders from the loading and unloading stations and move a pair of holders with articles therein into the flux dipping station and the tin dipping station. The conveyor is then stopped and elevators at the dipping stations are actuated to lower an article and immerse a portion thereof into a flux bath at the flux dipping station and to lower an article previously dipped into the flux and immerse a portion thereof into a bath of molten tin. At the end of predetermined individually adjustable time periods the elevators raise the articles from the flux and the tin baths and the conveyor is then actuated to move the holder with the tinned article therein from the tin dipping station into the unloading station and an empty holder into the loading station, and as the tinned article holder is moved from the tin dipping station it is dropped through a short distance to shake the excess tin from the article. The conveyor is again stopped for the loading time period during which an article is loaded into the holder at the loading station and the tinned article is unloaded at the unloading station. Photo-electric safety devices are provided at the loading and the unloading stations to prevent the actuation of the conveyor beyond the predetermined loading time period in the event that one of the operators has not completed the loading or the unloading operation and withdrawn his hands to a safe position prior to the expiration of the normal loading time period, and to stop the conveyor in the event that at any time while the conveyor is in motion an operator places his hands in the loading or unloading area.

Other objects and advantages of the invention will become apparent by reference to the following detailed description and the accompanying drawings, illustrating a preferred embodiment thereof, in which Fig. 1 is a plan view of the article dipping apparatus showing a pair of the article carriers in the loading and unloading stations;

Fig. 2 is a diagrammatic plan view of the apparatus showing the conveyor with the article carriers thereon and a pair of the article carriers in a loading station and an unloading station;

Fig. 3 is a diagrammatic view similar to Fig. 2 showing the conveyor advanced to position a pair of the article carriers in a flux dipping station and in a tin dipping station;

Fig. 4 is a fragmentary side elevational view of the article dipping apparatus;

Fig. 5 is a vertical cross-sectional view through the apparatus and the flux dipping station thereof taken along line 5—5 of Fig. 1;

Fig. 6 is a fragmentary vertical cross-sectional view through the apparatus and through the tin dipping station thereof taken along line 6—6 of Fig. 1;

Fig. 7 is a fragmentary vertical longitudinal section through the apparatus and the flux and the tinning stations taken along line 7—7 of Fig. 1;

Figs. 8 and 9 are front and end views of an article in the form of an electrical switching unit, the terminal portions of which are to be tinned in the present apparatus;

Figs. 10 and 11 are front and side views of an article holder of the apparatus;

Figs. 12 and 13 are front and side views of a carrier for slidably supporting the article holder thereon for vertical movement;

Fig. 14 is an enlarged fragmentary plan view of a portion of the tin pot and a mechanism for skimming the dross from the tin;

Fig. 15 is a fragmentary vertical sectional view of the skimming mechanism taken along line 15—15 of Fig. 14;

Fig. 16 is a fragmentary vertical cross-sectional view of the skimming mechanism taken along line 16—16 of Fig. 15;

Fig. 17 is a detailed vertical longitudinal sectional view of the skimming mechanism taken along line 17—17 of Fig. 14;

Fig. 18 is a fragmentary vertical sectional view of a portion of the apparatus showing the drive for the conveyor;

Fig. 19 is an enlarged detailed vertical sectional view taken along line 19—19 of Fig. 18 and showing the stop pin for stopping the driving sprocket in predetermined positions; and Figs. 20 and 20a are diagrammatic views of the electrical control system.

Referring particularly to Figs. 8 and 9 of the drawings, numeral 25 indicates an article which is to be partially dipped in a pool of flux and then into a pool of molten solder or tin for predetermined periods of time by the present apparatus to tin or solder coat a portion thereof. The article 25 is in the form of a multi-contact switch used in telephone switching apparatus and having a mounting plate 27 to one side of which is secured a plurality of pileups of contact springs 28, the upper ends of which have contacts mounted thereon and the lower ends or terminals 30 thereof are tinned in the present apparatus and have lateral projections 31 thereon. The lateral projections 31, which aid in anchoring conductors wound onto the terminals are spaced at different distances from the ends of the terminal on different contact springs of the pileups so that, as viewed in Fig. 9, they are disposed in an inclined row. On the opposite side and at one end of the mounting plate 27 an electro-magnet 32 is mounted for actuating an armature 33 which cooperates with other elements of the switch to effect the actuation of the contact springs 28.

The article dipping apparatus comprises a plurality of holders 38 (Figs. 1, 5, 6, 7, 10, and 11) for individually supporting the articles obliquely thereon with the terminals 30 directed downwardly and with the row of projections 31 on the terminals disposed in a horizontal position (Figs. 5 and 6). The holders 38 are mounted for vertical movement on carriers 40 (Figs. 1, 5, 6, 7, 12, and 13) which are secured in a predetermined uniformly spaced relation to each other on an endless chain conveyor 41 for movement therewith along a predetermined horizontal path into a loading station 43 (Figs. 1, 2 and 3), a flux dipping station 44, a tin dipping station 45, and an unloading station 46. The carriers 40 and the several stations are arranged relative to one another so that a pair of the carriers 40 are moved simultaneously into the unloading and the loading stations at one time and a pair of carriers are moved simultaneously into the dipping stations at another time, and when carriers are in the loading and unloading stations, no carriers are in the dipping stations, and vice versa.

The chain conveyor 41 is entrained about an idling sprocket 50 and a driving sprocket 51, the latter of which is driven from a continuously operating motor 52 through an electro-magnetic clutch and brake unit 53 (Fig. 18) for connecting and disconnecting the drive to and from the conveyor. In response to movement of a pair of carriers 40 on the conveyor 41 into loading and unloading stations 43 and 46, a carrier 40 on the conveyor trips a switch 56 (Fig. 1) of a control mechanism to deenergize the clutch and energize the brake to cause the conveyor and the carriers to stop for a predetermined time interval controlled by a timer to permit an article 25 to be loaded onto the carrier 40 in the loading station 43 and permit a tinned article 25 to be removed from the carrier 40 at the unloading station 46. At the end of the loading time interval the motor drive is reconnected to actuate the conveyor and advance carriers with articles 25 therein into the flux dipping station 44 and the tin dipping station 45, at which point another carrier on the conveyor 41 trips a switch 58 to cause the disengagement of the motor drive and the stopping of the conveyor. In response to the movement of the carriers 40 to the dipping stations an elevator 60 at the flux dipping station operates to lower the holder 38 on the carrier 40 and immerse the terminals 30 of the article 25 into a pool of liquid flux 61 in a pot 62 (Figs. 1, 4, 5, and 7) at the flux dipping station 44 and simultaneously therewith an elevator 64 at the tin dipping station 45 operates to lower the holder 38 on the carrier 40 and immerse the terminals on the article 25 into a bath of molten tin or solder 65 in a pot 66 at the tin dipping station. After a predetermined interval of time the elevators 60 and 64 raise the holders to their normal elevated position in response to which the conveyor is again actuated to advance the carrier 40 with the tinned article thereon into the unloading station 46 and to move an empty carrier into the loading station.

The idler sprocket 50 (Figs. 1 and 4) is mounted for rotation on a vertically disposed axle 70 which is supported on a bracket 71. This bracket in turn is fixedly secured to a horizontal frame plate 72 on which the components of the apparatus are supported, and which in turn is supported by a frame including a plurality of legs 73 resting on the floor. The driving sprocket 51 (Figs. 1, 6, and 18) is fixed to a shaft 75 which is journalled in suitable bearings mounted on a pair of horizontally disposed arms 76 and 77 of a supporting bracket 78 which is secured to the frame plate 72. The shaft 75 is connected to the driving element of the electro-magnetic brake and clutch unit 53 and the driven element of the unit is connected to a drive shaft 85 of a gear reducer 86. The gear reducer is connected to and driven by the motor 52 which is connected to power lines 88 (Fig. 20).

The electro-magnetic clutch and brake unit 53 has a clutch operating coil 89 (Fig. 20) for actuating the clutch in response to energization thereof and a brake actuating coil 90 for actuating the brake in response to energization thereof. The clutch and brake coils 89 and 90 are connected so that they are both operated simultaneously and when one is energized, the other is deenergized. Current for energizing the clutch and brake coils is supplied by a transformer 91, the primary of which is connected to the power lines 88, the current from the transformer being rectified by a rectifier 92. The clutch coil 89 is connected in series with a normally open contact 95–1 of a relay 95 and the brake coil 90 is connected in series with a normally closed contact 95–2 of the relay. The relay 95 is connected in series with a switch 97 and relay contacts 98–1, 99–1 of relays 98 and 99 and contacts 100–1 and 101–1 of photo-electric control units 100 and 101. Thus, when the switch 97 and the contacts 98–1 through 101–1 are closed, the relay 95 is energized and closes contacts 95–1 to energize the clutch coil and opens contact 95–2 to deenergize the brake coil. When the switch 97 or any of the contacts 98–1 through 101–1 is opened, the relay 95 is deenergized to effect the deenergization of the clutch and the energization of the brake to disconnect the drive and stop the conveyor with the carriers 40 in either the unloading and loading stations 43, 46 or in the dipping stations 44, 45.

Means are provided for stopping the conveyor 41 with the carriers 40 accurately positioned in the various operating stations, and for this purpose a stop pin 110 (Figs. 18 and 19) is mounted for vertical movement in a tubular guide 111 formed on the arm 77 of the bracket 78, and the stop pin 110 has a tapered end 112 engageable in tapered apertures 113, in the drive sprocket 51. The stop pin 110 is moved upwardly by a spring 117 (Fig. 19) into operative position in engagement with the apertures in the sprocket and is pulled downwardly into retracted position by a solenoid 118 which is mounted on the bracket 78 and has an armature 119 connected to the lower end of the stop pin. A transverse pin 120 carried by the armature 119 trips a normally open switch 122 to closed position when the stop pin 110 is in its upper position engaging an aperture 113 in the sprocket 51, and the pin 120 trips the normally open switch 97 mounted on the supporting arm 77 to closed position when the stop pin 110 is retracted by the energization of the solenoid 118.

As seen, particularly in Figs. 12, 13, the carriers 40 on the chain conveyor 41 for supporting the article holder 38 for vertical movement each comprises a vertically disposed carrier plate 130 from one face of which extend a plurality of apertured lugs 131 for receiving connecting pins 132, the pins 132 passing through the links of the chain conveyor 41 and serving to connect the carrier to the conveyor. A pair of horizontally disposed axles 133 are fixedly mounted on the carrier plate 130 and have rollers 134 which are rotatably supported on the ends of the axle and rest on and are supported by outer and inner tracks 135 and 136 (Figs. 1, 4, 5, 6, and 7). The tracks 135 and 136 support the carriers for movement along a predetermined straight path between the drive sprockets 50, 51 and the outer tracks 135 have flat semi-circular end portions 137 for engaging the outer rollers 134 and supporting the carriers 40 as they travel around the sprockets. Suitable vertically extending legs 138 and a frame member 139 support the tracks 135, 136, 137 at a predetermined elevation above the frame plate 72.

Referring to Figs. 5, 6, 7, 10 and 11 the article holder 38 is slidably mounted on the carrier 40 for vertical movement and comprises a vertically disposed holder plate 140, the vertical edges of which are slidable in gibs 141 on the carrier plate 130 (Figs. 12 and 13). A pair of blocks 142 having obliquely disposed seats 143 are mounted on the lower end of the plate 140 is spaced relation to each other for engaging the mounting plate 27 and supporting the article 25 obliquely with the pileup of contact springs therebetween and with the downwardly extending terminals 30 and the horizontally disposed rows of projections 31 thereon in position to be dipped into the flux and the tin baths. A cup 145 is provided on the holder plate 140 for receiving the lower end of the electromagnet 32 to protect it during the immersion of the article into the tin bath.

The article 25 is clamped in position on the seats 143 of the holder by a T-shaped clamping lever 146 which is mounted for pivotal movement about a pin 147 and has curved end portions 148 engageable with the article 25. The article clamping lever 146 is movable from a normal open position to a closed position (Figs. 5 and 7) and is held in either position by a pair of over-the-center springs 149. A link 150 is connected at one end to one end of the clamping lever 146 and connected at its other end to an actuating lever 151 which is pivotally mounted at 152 on the plate 140 and has a roller 153 rotatably mounted on its other end. As the carrier approaches the flux dipping station 44 the roller 153 on the actuating arms 151 engages a sloping cam plate 154 (Figs. 1, 4, and 5) and is cammed downwardly thereby to cause the clamping lever 146 to be moved into closed position and clamp the article 25 onto the seat 143 of the holder before the article is dipped into the flux and the tin. The cam plate 154 is formed on an arm 155 secured to the track 135. As the carrier moves along its path from the tin dipping station 45 the roller 153 engages an upwardly directed cam plate 156 on an arm 157 secured to the track 135 and is cammed upwardly thereby to effect the movement of the clamping lever 146 to its open position.

Adjustable stop members 160 (Figs. 10 and 11) on the holder plate 140 are engageable with fixed stop members 161 on the carrier plate 130 (Figs. 12 and 13) for limiting the downward movement of the holder 38 and stopping the article 25 in a predetermined position with the terminals 30 and the projections 31 thereon immersed in the flux and the tin baths. The carrier plate 130 has a vertical central slot 162 therein providing clearance for a vertically disposed bar 164 which is secured to the rear face of the holding plate 140 and has a transversely bent end portion 165.

A roller 168 on the holder plate 140 rides on a horizontally disposed track 169 and serves to support the holder 38 for movement with the carrier 40 and the conveyor 41 at a predetermined elevation. The track 169 is supported on vertical frame members 170 mounted on the tracks 136 and is substantially continuous except for movable sections 171 and 172 at the flux dipping station and the tin dipping station, respectively, and for a predetermined distance following the tin dipping station.

The movable track section 171 at the flux dipping station 44 (Figs. 1 and 5) forms part of the elevator 60 and is connected to a slide 176 thereof for vertical reciprocation in gibs 177 on a vertical standard 178 which is fixed to the frame plate 72. The slide 176 is connected to one end of a piston rod 180, the piston of which is reciprocable in the cylinder of a fluid actuator 182 fixedly supported on the standard 178. Air from a compressed air line 183 is admitted to opposite ends of the cylinder to effect the reciprocation of the piston and the track section 171 under control of a valve 184 which is shifted from one position to another by a pair of solenoids 185—186 (Fig. 20a).

At the tin dipping station 45 (Figs. 1 and 6) the movable track section 172 forms part of the elevator 64 and is connected to a slide 187 thereof which is vertically reciprocable on a standard 188 fixed to the frame plate 72. The slide 187 is connected to the upper end of a piston rod 189, the piston of which is reciprocable within the cylinder of a fluid actuator 190 secured to the standard 188. The fluid actuator is connected to the air line 183 and has a valve 191 shiftable from one position to the other by solenoids 192 and 193 for controlling the reciprocation of the piston rod 189 and the track section 172.

As the pair of carriers 40 are moved into the flux dipping station 44 and the tin dipping station 45 with their rollers 168 resting on the movable track sections 171 and 172, respectively, the roller 168 of another holder 38 trips the switch 58 (Figs. 1, 5 and 20a) to closed position and thereby completes a circuit through the switch 58, contacts 194–1 of a relay 194, the relay 99, and the secondary of a transformer 195, the primary of which is connected to the power lines 88. The relay 99 is thus energized and opens its contacts 99–1, 99–2, and closes contacts 99–3, the closing of the latter serving to lock in the relay circuit. The opening of contact 99–1 breaks the circuit to and causes the deenergization of the relay 95 and causes the contacts 95–1 to open and the contacts 95–2 to close, thus deenergizing the clutch and energizing the brake and stopping the conveyor 41. The opening of the contact 99–2 breaks a circuit to and effects the deenergization of a relay 196 and the opening of its contacts 196–1, which opens the circuit and effects the deenergization of the stop pin solenoid 118. With the deenergization of the solenoid 118, the spring 117 moves the stop pin 110 into the aperture 113 in the driving sprocket 51 to accurately position it with a pair of the carriers 40 in the dipping stations 44 and 45.

The movement of the stop pin 110 to its upper position also trips normally open switch 122 to its closed position which completes a circuit through the switch 58, contacts 98–2 of relay 98, switch 122, and a timer 197 which times out after approximately two seconds to effect the closing of its contacts 197–1. This completes a circuit through and energizes a relay 198 and closes its contacts 198–1 and 198–2. The closing of these contacts completes circuits through and energizes the solenoids 186, 192 of the fluid actuators 182, 190 to effect the downward movement of the track sections 171 and 172 and the holders 38 with the articles 25 therein to their lower position to immerse the terminals 30 of the articles into the flux bath 61 and the molten tin bath 65, respectively. As the article holders 38 reach their lower positions, the slides 176, 187 actuate switches 199 and 200 (Figs. 5, 6 and 20a) at the flux and the tin dipping stations 44, 45 to complete circuits through coils 201 and 202 of timers 203 and 204. These timers are individually adjustable to time out after selected time intervals. The timers 203 and 204 when timed out, close contacts 205 and 206, which complete circuits through and effect the energization of the valve actuating solenoids 185, 193 and cause the fluid actuators 182, 190 to raise the movable track sections 171 and 172 and the article holders 38 thereon to their normal upper positions.

In response to movement of the article holders to their normal upper positions a pair of switches 207, 208 are closed by the slides 176, 187 of the article raising and lowering elevators 60, 64 and with the closing of the switches 207 and 208 a circuit is completed through and effects the energization of the relay 194 and the opening of the relay contacts 194-1. This opens the circuit to and deenergizes the relay 99 which opens its contacts 99-3 and closes its contacts 99-1 and 99-2. As the contact 99-2 closes, it effects the energization of relay 196 and the closing of its contacts 196-1 which in turn effects the energization of the relay 118 and the retraction of stop pin 110. As the contact 99-1 closes, it completes a circuit to and effects the energization of the relay 95, which effects the energization of the clutch and the deenergization of the brake and the actuation of the conveyor 41.

As previously mentioned, a portion of the track 169 for supporting the article holder in its normal upper position is omitted for a predetermined distance immediately following the tin dipping station 45 so that as the conveyor 41 moves the carrier 40 from the station 45 after the tin dipping operation, the roller 168 of the article holder 38 rides off of the movable track section 172 (Figs. 1 and 7), causing the holder 38 and the article 25 therein to drop. The downward movement of the article holder 38 is arrested with an impact by the engagement of the hooked end 165 of the rod 164 of the holder with a surface 210 of an abutment member 211 to cause some of the excess molten tin on the terminals 30 of the article 25 to be shaken therefrom. The abutment member 211 is secured to and extends upwardly from the inner channel track 136 (Fig. 6). As the conveyor 41 further advances the carrier 40 and the article holder 38, the roller 136 of the article holder engages and moves upwardly on an inclined surface of a cam 212 (Figs. 4, 6 and 7) and rides off of the cam, causing the holder to again drop. The downward movement of the holder is again arrested with an impact by the engagement of the hooked end of the arm 164 with a surface 213 of the abutment member 211 to shake any remaining excess tin from the article 25. As the conveyor advances further, the roller 168 of the holder 38 engages and rides up an inclined portion 214 of the track 169 onto the upper horizontal surface thereof.

As the conveyor continues to advance and moves the carrier 40 with the tin dipped article 25 therein into the unloading station 46 and simultaneously therewith moves a carrier 40 with an empty article holder 38 into the loading station 43, another carrier 40 on the conveyor trips the switch 56. This closes a circuit through and energizes a relay 216 which closes its contacts 216-1 and 216-2. The closing of contact 216-1 locks in the relay circuit and the closing of contact 216-2 completes a circuit to a timer 217 which immediately closes a contact 217-1. This completes a circuit to and effects the energization of the relay 98 and the opening of its contacts 98-1, 98-2, 98-3. With the opening of the contact 98-1 the relay 95 is deenergized and effects the deenergization of the clutch and the energization of the brake to stop the conveyor 41. The opening of the contact 98-3 breaks the circuit to and deenergizes the relay 196 and opens its contacts 196-1 which deenergizes the stop pin solenoid 118 and permits the spring 117 to actuate the stop pin 110 into engagement with aligning aperture 113 in the drive sprocket 51 to accurately position the conveyor 41 and the carriers 40 at the loading and unloading stations 43 and 46. The opening of contact 98-2 renders inoperative the control circuit for actuating the elevators 60 and 64 at the dipping stations to prevent the accidental actuation of the elevators during movement of the conveyor 41.

The timer 217 is set for timing out after a suitable time interval sufficient to permit the loading and unloading of the holders and after the timer has timed out, the contact 217-1 is opened, which effects the deenergization of relay 98 and the closing of its contacts 98-1, 98-2, and 98-3. The closing of contact 98-3 effects the energization of relay 196 and closing of its contacts which effects the energization of the solenoid 118 to retract the stop pin 110 from the driving sprocket. The closing of contact 98-1 completes a circuit to and effects the energization of the relay 95, which in turn effects the energization of the clutch and the deenergization of the brake and the actuation of the conveyor 41.

From the description thus far, it will be seen that the conveyor is actuated through successive pairs of steps, and serves to move a pair of carriers 40 from the dipping stations 44, 45 (Fig. 3) and move a pair of carriers into the loading and unloading stations 43, 46 (Figs. 1 and 2) during the first step, and then move the pair of carriers from the loading and unloading stations (Fig. 2) and advance a pair of carriers with articles therein into the dipping stations during the second step (Fig. 3). If we follow the movement of a selected carrier 40 through its path of movement, we shall see that when it arrives at the loading station 43 (Fig. 2) the conveyor 41 is stopped for a predetermined loading time interval, during which an article 25 is loaded into the article holder. At the end of the loading time interval the conveyor is actuated to advance the carrier one step from the loading station 43 into the flux dipping station 44 (Fig. 3), during which movement the clamping elements 146, 150, 151 are actuated by the sloping cam plate 154 to clamp the article 25 securely to the holder 38. When the carrier arrives at the dipping station 44 the conveyor is stopped and the holder 38 with the article 25 thereon is lowered to dip the terminals 30 of the article into the fluxing bath 61 for a predetermined dipping interval of time controlled by the timer 203. At the end of the dipping time interval the holder 38 with the article 25 is raised to its normal elevated position and the conveyor 41 is actuated to advance the carrier 40 one step to an idle position (Fig. 2) for the predetermined loading time interval while another article is loaded onto the holder at the loading station and a tinned article is unloaded from the carrier at the unloading station.

At the end of the loading time interval the conveyor is again actuated one step to advance the carrier into the tin dipping station 45 (Fig. 3) and the conveyor is stopped. The holder 38 is lowered to dip the terminals 30 of the article into the bath of molten tin for a predetermined time interval controlled by the timer 204, and at the end of the tin dipping time interval the holder 38 is raised to its normal elevated position and the conveyor 41 is actuated to advance the carrier 40 and the tinned article 25 thereon one step into the unloading station 46. During the first portion of the movement of the carrier 40 from the tin dipping station 45 to the unloading station 46, the holder is dropped twice to shake the excess molten tin from the article 25, and as the carrier advances the actuating lever 151 is actuated by the sloping cam plate 156 to raise the article clamping arm 146 to its open position to unclamp the article 25. At the unloading station the carrier 40 is stopped for the predetermined loading time interval during which the tinned article 25 is removed therefrom.

The photo-electric control units 100 and 101 are provided at the unloading and loading stations of the apparatus for stopping the conveyor in the event that one of the operators at either station takes more time than the normal loading time interval for either unloading or loading the article holder and withdrawing his hands to a point of safety remote from the apparatus, or in the event that at any time an operator places his hands in the loading or unloading area while the conveyor is in motion. Each of the photo-electric units comprises a light source 220 (Fig. 20) for projecting a beam of light 221 onto a photo-electric cell 222 and across the paths of movement of the articles 25 and the operator's hands during the loading and unloading operations.

When the beams of light 221 are intact the photo-electric units serve to maintain the contacts 100–1 and 101–1 (Fig. 20) closed to condition the circuit for actuating the relay 95. If during the loading or unloading of the article holder 25, one of the light beams 221 is intercepted by the operator at the termination of the normal loading time interval, the photo-electric control unit associated with the intercepted light beam will maintain its contacts 101–1 or 100–1 open and thereby maintain the control circuit for the relay 95 open, after the contact 98–1 has been closed in response to the timing out of the timer 217 at the termination of the normal loading time interval. With either of the contacts 100–1 or 101–1 open, the relay 95 and the clutch coil 89 remain deenergized and the brake coil 90 remains energized to maintain the conveyor 41 in its stopped condition. If at any time while the conveyor 41 is in motion one of the light beams 221 is intercepted, the control unit associated therewith serves to disconnect the conveyor drive and stop the conveyor 41 in the manner similar to that described above.

Each of the photo-electric units 100, 101 is connected in series with a manually operated start switch 224, a contact 225 and the transformer 195. Also connected in series with the start switch 224 and the contact 225 is a relay 226 which has a contact 226–1 and a plurality of contacts 226–2, the latter contacts serving to connect the motor to the power lines 88. The contact 225 is actuated by a control unit 228 for automatically controlling the temperature of the tin pot 66 by connecting and disconnecting a heating unit 229 for the tin pot to the transformer 195. The control unit 228 is connected to the transformer through a normally open start switch 231, and a relay 233 is connected in series with the start switch 231 and a contact 234. The relay 233 has a normally open contact 233–1 in series with the heating unit 229.

In response to closing of the start switch 231 the control unit 228 is connected to the power source and closes the contacts 234 to effect the energization of the relay 233 and the connection of the heating element 229 to the power source. After a predetermined time delay sufficient for the tin in the tin pot to be thoroughly heated, the contact 225 is closed, after which the switch 224 is closed to connect the relay 226 and the photo-electric control units 100 and 101 to the power source. This energizes the relay 226 and closes contacts 226–1 and 226–2 to lock the relay in and to connect the main drive motor 52 to the power line 88 and thereby places the apparatus in readiness for operation.

The tin pot 66 is mounted for vertical movement and is adjusted by means of a jack screw 236 to maintain the molten tin therein at a predetermined level. Means are provided for skimming the dross from the pool of molten tin which comprises an upright skimming blade 242 extending transversely across the upper portion of the pool of tin 65. The skimming blade has a pair of trunnions 243 which extend from opposite ends of the upper portion thereof and are oscillatably supported in apertures in a carriage 245. As viewed in Fig. 15, the carriage 245 has a T-shaped apertured end portion which is slidably mounted on a guide rod 247 and has a slotted upper end for slidably receiving a bar 248 (Fig. 16) for preventing tilting movement of the carriage on the guide rod 247. The guide rod 247 and bar 248 are supported at their ends by suitable frame members 249. The carriage 245 has an arm 251 which extends transversely from the T-shaped end portion thereof above the pool of tin for supporting the skimming blade 242 and other elements thereon.

A counterweighted arm or lever 253 (Fig. 15) is secured to the projecting portion of the trunnion 243 of the skimming blade 242 and has a roller 254 mounted on one end thereof. The carriage 245 is moved to the left to its normal position against a stop 255 as shown in Figs. 4 and 15 by a weighted pulley 255a and a cable 256, one end of which is secured to a stationary bracket at 257. The cable passes around the weighted pulley 255a and around an idler pulley 258 (Fig. 4) and has its other end secured at 259 to the carriage 245. Movement to the right as viewed in Figs. 4 and 15 is imparted to the carriage 245 by a carrier 40, an axle 133 of which is adapted to engage a connector arm 262 on the carriage. The arm 262 is secured to a pivot pin 263 (Figs. 14–16) oscillatably supported in a lug 264 on the arm 251 of the carriage 245. A trip lever 265 is fixedly secured to the other end of the pivot pin 263 and is engageable with rollers 266 and 267 at opposite ends of its travel. The rollers 266 and 267 are mounted on the outer carrier track 136 in predetermined spaced relation to each other for engaging the trip lever 265 and actuating it through a predetermined angular movement to move the connector arm 262 to and from an operative position in the path of movement of the carrier axles 133 and an inoperative position below the path of movement of the axles as shown in Fig. 15. An over-the-center spring 269 connected at one end to the trip lever 265 and at the other end to the arm 251 of the carriage serves to yieldably retain the connector arm 262 in either position.

In response to movement of a carrier 40 into the tin dipping station 45 the axle 133 of a carrier 40 will engage the connector arm 262 and move the carriage 245 to the right as viewed in Fig. 15 and cause the lower portion of the pivoted skimming blade 242 to be dragged across the top surface of the pool of molten tin and skim the dross therefrom. As the skimming blade 242 is dragged across the pool of tin it tilts and only a relatively small portion thereof engages the pool of tin so that as the dross is skimmed off a minimum amount of tin is removed therewith. The skimming blade pushes the dross onto the upwardly inclined portion of a transfer plate 271 on the end wall of the tin pot 66, across the transfer plate, and off of the downwardly extending portion thereof into a dross chute 272.

As the skimmer blade 242 passes over the transfer plate 271 the roller 254 on the lever fixed to the skimming blade 242 engages a sloping lower surface 273 of a pivoted arm or cam member 274 which will be moved upwardly and will stress the lever and the skimming blade 242 for clockwise movement about the pivot 243 to maintain the lower edge of the skimming blade in engagement with the transfer plate 271 as the blade pushes the dross thereover into the dross chute 272. The arm or cam member 274 is pivotally mounted at 275 to a frame member 276 which is supported at its ends by the frame members 249 and has a stop pin 277 for supporting the arm 274 in a normal position as shown in Fig. 14. As the carrier 40 comes to rest in the tin dipping station 45 the skimmer blade 242 stops in the position shown in Fig. 7.

After the article has been dipped into the molten tin for a predetermined time and withdrawn therefrom, the conveyor is actuated. As the carrier 40 is moved from the dipping station 45, the carriage 245 is advanced therewith a short distance when the trip lever 265 on the carriage engages the roller 267 and is actuated thereby to its lower position, causing the connector arm 262 to disengage itself from the axle 133 of the carrier 40 and stop the carriage 245. When the connector arm 262 is disengaged from the carrier, the carrier is returned to its normal position (Figs. 4, 15) by the weighted pulley 255a.

During the return movement of the carriage 245 the roller 254 on the skimming blade arm 253 rides up an inclined surface 278 of the arm 274 to oscillate the skimming blade 242 about its pivot 243 and raise it above the pool of tin 65 during its return movement. The roller 254 rides off of the inclined surface 278 on the arm 274 onto a horizontal surface 279 thereof and then onto a horizontal track 280 which is secured to frame member 276 and supports the roller 254 in its elevated position until the carriage 245 approaches its normal retracted position, at which time the roller 254 rides off of the track and permits the skimming blade 242 to return to its vertical position.

The flux pot 62 (Fig. 5) has a central vertical partition 282 which divides the pot into two chambers and which has its upper edge located at a level lower than the top edge of the pot 62. Liquid flux is continuously pumped from a supply tank 284 (Fig. 4) through a pipe 285 into one chamber where it is maintained at a predetermined level by the partition 282 and overflows into the other chamber and is returned through pipe 286 to the supply tank.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed:

1. In an article dipping apparatus having a dipping station and a plurality of article holders movable along a predetermined path through the dipping station, a pot at the dipping station for holding a supply of molten solder, a skimming blade for skimming the dross from the molten solder, a carriage for suspending the skimming blade for free pivotal movement thereon about a horizontal axis transversely of said path and with a portion of the blade in engagement with the upper surface of the molten solder, means for supporting the carriage for horizontal reciprocable movement over the pot and parallel to said path, a connector element mounted on the carriage for pivotal movement to and from first and second positions and operable in the first position for engaging an article holder as the holder is being moved into the dipping station to connect the carriage to the holder for movement therewith from a retracted position adjacent one end of the pot to a forward position adjacent to the other end of the pot and thereby cause the skimmer blade to skim the dross from the molten solder, tripping means responsive to movement of the carriage to its forward position for moving the connector element from its first position to its second position to disengage it from the article holder, means for returning the carriage to its retracted position, and tripping means responsive to movement of the carriage to its retracted position for moving the connector element to its first position.

2. In an article dipping apparatus having a dipping station and a plurality of article holders movable along a predetermined path through the dipping station, a solder pot at the dipping station for holding a pool of molten solder and having an end wall, a dross transferring plate on said end wall of the solder pot with a portion thereof sloping into the pool of solder, a skimming blade for skimming the dross from the molten solder, a carriage for suspending the skimming blade for free pivotal movement thereon about a horizontal axis substantially perpendicular to said path and with a portion of said blade in engagement with the upper surface of the molten solder, means for supporting the carriage for horizontal reciprocable movement over the pot and parallel to said path thereof, a connector element mounted on the carriage for pivotal movement to and from first and second positions and operable in the first position for engaging an article holder as the holder is being moved into the dipping station to connect the carriage to the article holder for movement therewith in one direction across the solder pot from a normal retracted position to an advanced position to cause the skimming blade to skim the dross from the pool of molten solder and move it over the transfer plate and out of the solder pot, trip means operable in response to movement of the carriage to its advanced position for moving the connector element from its first position to its second position to disengage it from the holder, means for returning the carriage to and yieldably maintaining it in said normal retracted position, trip means operable in response to movement of the carriage to its retracted position for moving the connector element to its first position, and means for raising and holding the skimming blade above the pool of molten solder during the return movement of the carriage.

3. In an article dipping apparatus having a dipping station and a plurality of article holders movable along a predetermined path through the dipping station, a solder pot at the dipping station for holding a pool of molten solder and having an end wall, a dross transferring plate on said end wall with a sloping portion extending into the pool of solder, a skimming blade for skimming the dross from the molten solder, a carriage for suspending the skimming blade for free pivotal movement about a horizontal axis perpendicular to said path and with a portion thereof in engagement with the upper surface of the molten solder, an actuating lever connected to the skimming blade for moving it about its pivot, means for supporting the carriage for horizontal reciprocable movement over the pot, and parallel to said path, a connector element mounted on the carriage for pivotal movement to and from first and second positions and operable in the first position for engaging said article holder and operatively connecting the carriage to the article holder for movement therewith across the solder pot from a normal retracted position to an advanced position to cause the skimming blade to skim the dross from the pool of molten solder and move it over the transfer plate and out of the solder pot, a pivoted cam member mounted for limited vertical pivotal movement in the path of movement of the actuating lever and having a lower surface engageable with the actuating lever as the carriage is moved to its advanced position to turn the lever and press the skimming blade against the transfer plate as said skimming blade moves the dross over said plate, tripping means operable in response to movement of the carriage to its advanced position for moving the connector element from its first position to its second position to disengage it from the holder, means for returning the carriage to and yieldably maintaining it in said normal retracted first position, tripping means operable in response to movement of the carriage to its retracted position for moving the connector element to its first position, said pivoted cam member having an upper cam surface engageable with the actuating lever as the carriage returns to its retracted position to turn the lever to a raised position and elevate the skimming blade above the solder pot, and a track mounted on said carriage-supporting means for supporting the lever in its raised position after it leaves the pivoted cam member and for disengaging the lever as the carriage reaches its retracted position.

4. In an article-coating apparatus, a loading station, a coating station in predetermined space relation to said loading station, a plurality of article holders for supporting articles to be coated, a conveyor for supporting the article holders thereon for movement along a predetermined path and alternately through said loading station and said coating station, said holders being spaced on said conveyor so that when a holder is in either one of said stations no holder is in the other of said stations, drive means for advancing said conveyor, means responsive to the movement of an article holder into said loading station for rendering said drive means inoperative for a predetermined period of time to stop said conveyor and permit the loading of an article onto the holder, and adjustable means responsive to movement of an article holder into said coating station for rendering said drive means inoperative for an adjustable period of time to stop said conveyor and permit the coating of the article.

5. In an article-coating apparatus having a loading station and a coating station in a predetermined spaced relation to each other, the combination therewith of a plurality of article holder for supporting articles to be coated, a conveyor for supporting the article holders thereon for movement along a predetermined path through said loading station and said coating station, said holders being spaced on said conveyor so that when a holder is in either one of said stations no holder is in the other of said stations, means for advancing said conveyor, adjustable means responsive to the movement of an article holder into said loading station for stopping said conveyor for an adjustable period of time to permit the loading of an article onto the holder, and adjustable means responsive to movement of an article holder into said coating station for stopping said conveyor for an adjustable period of time to permit the coating of the article.

6. In an article-coating apparatus having a loading station and a coating station in a predetermined spaced relation to each other, the combination therewith of a plurality of article holders for supporting articles to be coated, a conveyor for supporting the article holders thereon for movement along a predetermined path and alternately through said loading station and said coating station, said holders being spaced on said conveyor so that when a holder is in either one of said stations no holder is in the other of said stations, drive means for advancing said conveyor, means responsive to the movement of an article holder into said loading station for rendering said drive means inoperative for a predetermined period of time to stop said conveyor and permit the loading of an article onto the holder, photoelectric means at said loading station including a light beam intercepted during loading of an article onto the holder for rendering said drive means inoperative while the light beam is intercepted, and adjustable means responsive to movement of an article holder into said coating station for rendering said drive means inoperative for an adjustable period of time to stop said conveyor and permit the coating of the article.

7. In an article-coating apparatus having a loading station, a coating station, and an unloading station in predetermined spaced relation to each other, the combination therewith of a plurality of article holders for supporting articles to be coated, a conveyor for supporting the article holders thereon for movement along a predetermined path through said stations, said holders being spaced on said conveyor so that said carriers are advanced simultaneously into said loading and said unloading stations and so that when said carriers are in said loading and said unloading stations no carrier is in said coating station and when a carrier is in said coating station no carriers are in said loading and said unloading stations, drive means for advancing said conveyor, means responsive to the movement of article holders into said loading and said unloading stations for rendering said drive means inoperative for a predetermined period of time to stop said conveyor and permit the loading of an article at said loading station and the unloading of an article at said unloading station, photoelectric means at said loading station and at said unloading station including light beams intercepted during loading and unloading of articles for rendering said drive means inoperative while any of said light beams is intercepted, and adustable means responsive to movement of an article holder into said coating station for rendering said drive means inoperative for an adjustable period of time to stop said conveyor and permit the coating of the article.

8. In an article-coating apparatus having a loading station and a coating station in a predetermined spaced relation to one another, a plurality of carriers, a conveyor for supporting the carriers thereon for movement along a predetermined path through said loading station and said coasting station, said carriers being spaced on said conveyor so that when a carrier is in either one of said stations no carrier is in the other one of said stations, article holders mounted on the carriers for movement therewith and for transverse movement relative thereto, means for advancing said conveyor, a track for supporting the article holders at a predetermined level for movement with the conveyor and including a movable track section at said coating station, means at said coating station for holding a supply of coating material, mechanism at said coating station for moving said movable track section and an article holder thereon from a normal first position with said track section in alignment with said track to a predetermined second position to dip the articles into the coating material and for moving the track section and said article holder to said first position, means responsive to the movement of a carrier into said coating station for stopping the conveyor and for effecting the actuation of said mechanism to move said track section to said second position, adjustable means responsive to movement of said track section to said second position for rendering said mechanism inoperative for an adjustable time interval and for rendering said mechanism operable at the end of said time interval to return said track section to said first position, and means responsive to the movement of said track section to said first position to start the conveyor.

9. In an article-coating apparatus having a loading station and a pair of coating stations in predetermined spaced relation to one another, the combination therewith of a plurality of carriers, a conveyor for supporting the carriers thereon for longitudinal movement along a predetermined path through said loading station and said pair of coating stations, said carriers being spaced on said conveyor so that said carriers are advanced simultaneously into the coating stations and so that when said carriers are in said coating stations no carrier is in said loading station and when a carrier is in said loading station no carriers are in said coating stations, article holders mounted on said carriers for movement therewith and for transverse movement relative thereto, means for advancing said conveyor, a track for supporting the article holders for longitudinal movement with the conveyor and including a transversely movable track section at each of the coating stations, means at said coating stations for holding supplies of coating materials, a mechanism at each of said coating stations for moving said track sections and said article holders thereon from normal first positions with said track sections in alignment with said track to predetermined second positions for dipping the articles into the coating materials and for moving the track sections and said article holders thereon to said normal first positions, means responsive to the movement of carriers into said coating stations for stopping the conveyor and for effecting the actuation of said mechanisms to move the track sections to said second positions, adjustable means at each of said coating stations operable in response to movement of said track sections to said lower position for individually rendering said mechanisms inoperative for adjustable periods of time and for rendering said mechanisms operative at the end of said periods of time to move said track sections to said first position, and means responsive to the movement of both of said movable track sections to said first position to start the conveyor.

References Cited in the file of this patent

UNITED STATES PATENTS

| | | |
|---|---|---|
| 928,172 | Bernardin | July 13, 1909 |
| 2,013,005 | Muscat | Sept. 3, 1935 |
| 2,135,892 | Granstedt | Nov. 8, 1938 |
| 2,234,586 | Bertalan | Mar. 11, 1941 |
| 2,241,556 | MacMillin et al. | May 13, 1941 |
| 2,267,273 | Garbe | Dec. 23, 1941 |
| 2,341,198 | Weiskopf | Feb. 8, 1944 |
| 2,366,398 | Harrington | Jan. 2, 1945 |
| 2,380,873 | Schafer et al. | July 31, 1945 |
| 2,679,824 | Schmuldt | June 1, 1954 |
| 2,723,922 | Fleming | Nov. 15, 1955 |
| 2,737,278 | Bartelt | Mar. 6, 1956 |
| 2,776,640 | Miklofsky | Jan. 8, 1957 |
| 2,796,776 | Locke et al. | June 25, 2957 |
| 2,798,583 | Jeszka et al. | July 9, 1957 |

FOREIGN PATENTS

| | | |
|---|---|---|
| 4,849 | Great Britain | 1906 |
| 17,434 | Great Britain | July 31, 1912 |